United States Patent
Hardjono et al.

(10) Patent No.: US 8,230,010 B1
(45) Date of Patent: Jul. 24, 2012

(54) SYSTEM, DEVICE, AND METHOD FOR CONTROLLING ACCESS IN A MULTICAST COMMUNICATION NETWORK

(75) Inventors: Thomas P. Hardjono, Winchester, MA (US); Bradley Cain, Cambridge, MA (US)

(73) Assignee: Rockstar Bidco LP, New York, NY (US)

( * ) Notice: Subject to any disclaimer, the term of this patent is extended or adjusted under 35 U.S.C. 154(b) by 2368 days.

(21) Appl. No.: 09/607,007

(22) Filed: Jun. 29, 2000

(51) Int. Cl.
G06F 15/16 (2006.01)

(52) U.S. Cl. ........................................ 709/204

(58) Field of Classification Search ................ None
See application file for complete search history.

(56) References Cited

U.S. PATENT DOCUMENTS

| | | | | |
|---|---|---|---|---|
| 5,682,478 A | * | 10/1997 | Watson et al. | 709/229 |
| 5,748,736 A | * | 5/1998 | Mittra | 713/163 |
| 6,088,451 A | * | 7/2000 | He et al. | 726/8 |

OTHER PUBLICATIONS

Fenner, Internet Engineering Task Force (IETF) Request for Comments (RFC) 2236, *Internet Group Management Protocol, Version 2* (Nov. 1997).
Cain et al., Internet Engineering Task Force (IETF) Internet Draft draft-ietf-idmr-igmp-v3-04.txt, *Internet Group Management Protocol, Version 3* (Jun. 2000).
Estrin et al., Internet Engineering Task Force (IETF) Request for Comments (RFC) 2362, *Protocol Independent Multicast-Sparse Mode (PIM-SM): Protocol Specification* (Jun. 1998).
Deering et al., Internet Engineering Task Force (IETF) Internet Draft draft-ietf-pim-v2-dm-03.txt, *Protocol Independent Multicast Version 2 Dense Mode Specification* (Jun. 7, 1999).
Wei, Internet Engineering Task Force (IETF) Internet Draft draft-ietf-pim-v2-auth-00.txt, *Authenticating PIM Version 2 Messages* (Nov. 11, 1998).
Kent et al., Internet Engineering Task Force (IETF) Request for Comments (RFC) 2401, *Security Architecture for the Internet Protocol* (Nov. 1998).
www.accuhash.com/what-is-sha1.html; downloaded Dec. 2, 2006; Accushas, "what is SHA-1?" 1 pp.
www.accuhash.com/what-is-md5.html; downloaded Dec. 2, 2006; Accuhas, "what is MD5?" 2 pp.
Krawczyk, H., HMAC: Keyed-Hashing for Message Authentication; Informational Comments, Network Working Group.

* cited by examiner

*Primary Examiner* — Krista Zele
*Assistant Examiner* — Azizul Choudhury
(74) *Attorney, Agent, or Firm* — Anderson Gorecki & Manaras

(57) ABSTRACT

A system, device, and method for controlling access in a multicast communication network uses a distributed host authentication scheme to prevent unauthorized hosts from joining a shared multicast distribution tree. An authorized host is provided with access information for accessing the shared tree. Certain access information is also distributed to at least a designated device associated with the host, although the access information may be distributed to other devices as well. The designated device uses the access information to authenticate the host and establish a security agreement with the host. Other devices may use the access information to authenticate the host in the event that the designated device is unable to authenticate the host. An authenticated host is added to the shared tree, while a host that cannot be authenticated is prevented from joining the shared tree.

130 Claims, 8 Drawing Sheets

SYSTEM, DEVICE, AND METHOD FOR CONTROLLING ACCESS IN A MULTICAST COMMUNICATION NETWORK

FIELD OF THE INVENTION

The present invention relates generally to communication systems, and more particularly to controlling access to a shared multicast distribution tree in a multicast communication network.

BACKGROUND OF THE INVENTION

In today's information age, communication networks are often used for transporting information from an information provider to one or more information consumers.

One technique for transporting information from an information provider to a group of information consumers over the communication network is known as "multicasting." Multicasting allows the information provider (referred to hereinafter as a "multicast source") to transmit a single unit of multicast information (referred to hereinafter as a "multicast packet") simultaneously to all information consumers (referred to hereinafter individually as a "multicast client" and collectively as "multicast clients") in the multicast group, specifically by addressing the multicast packet to the multicast group using a multicast address. The multicast clients monitor the communication network for multicast packets addressed to the multicast group.

In order to distribute multicast packets from a particular multicast source S to the multicast clients for a particular multicast group G, the multicast packet is routed through the communication network by a number of routers. The communication network may include multiple routing domains, and therefore the multicast packet may traverse multiple routing domains. Each router runs various routing protocols to determine, among other things, a "next hop" for each packet based upon address information in the packets. Such routing information is used to establish a multicast distribution tree (referred to hereinafter as the "shared tree"), and is maintained by each router in one or more routing tables (often referred to as a "routing information base").

One problem that plagues many multicast communication networks is security, or more specifically, the lack thereof. Many multicast communication networks are based upon an anonymous receiver model in which any host can join the shared tree, for example, using a group management mechanism such as the Internet Group Management Protocol (IGMP) as described in Fenner, Internet Engineering Task Force (IETF) Request for Comments (RFC) 2236 entitled *Internet Group Management Protocol, Version* 2 (November 1997) and in Cain et al., Internet Engineering Task Force (IETF) Internet Draft draft-ietf-idmr-igmp-v3-04.txt entitled *Internet Group Management Protocol, Version* 3 (June 2000), which are hereby incorporated herein by reference in their entireties. This anonymous receiver model exposes the shared tree to various types of attacks.

One attempt to protect the shared tree involves the use of data encryption to prevent unauthorized hosts from accessing multicast data. For data encryption, a group-wide encryption key (referred to hereinafter as the "group key") is used to encrypt and decrypt all multicast data for a particular multicast group. The group key is distributed to the multicast source as well as to all authorized multicast clients (hosts). The multicast source uses the group key to encrypt the multicast data, while all authorized multicast clients use the group key to decrypt the multicast data. Unauthorized hosts that receive the encrypted multicast data are unable to decrypt the multicast data, and are therefore prevented from accessing the multicast data.

Another attempt to protect the shared tree involves the authentication of control messages between multicast routers. Specifically, the multicast routers exchange various control messages for, among other things, joining the shared tree. These control messages are authenticated hop-by-hop according to a predetermined authentication scheme. By authenticating all control messages, only authorized multicast routers are able to join the shared tree.

Unfortunately, neither data encryption nor control message authentication prevents an unauthorized host from joining the shared tree and thereby consuming valuable communication resources. Because authentication operates only between the multicast routers, an unauthorized host can still join the shared tree, specifically by sending a join request, for example, using IGMP or other group management mechanism. The multicast routers establish the appropriate multicast routes for routing multicast packets to the unauthorized host, perhaps even using authentication to perform hop-by-hop authentication. As a member of the shared tree, the unauthorized host receives multicast packets. This is true even if the multicast packets are protected using data encryption, in which case the unauthorized host simply discards the encrypted multicast data.

Thus, a technique for controlling access in a multicast communication network is needed.

SUMMARY OF THE INVENTION

A distributed host authentication scheme is used to prevent an unauthorized host from joining a shared multicast distribution tree. The host accesses the shared tree through a designated device. In order to join the shared tree, the host obtains access information from a key server. Certain access information is distributed to at least the designated device, although the access information may also be distributed to other devices. The designated device uses the access information to authenticate the host and establish a security agreement with the host. Other devices may use the access information to authenticate the host in the event that the designated device is unable to authenticate the host. An authenticated host is added to the shared tree, while a host that cannot be authenticated is prevented from joining the shared tree.

In an exemplary embodiment of the invention, the shared tree is a Protocol Independent Multicast (PIM) tree. The designated device is a PIM designated router (DR) through which the host accesses the shared tree. In order to join the shared tree, the host obtains access information from a key server. Certain access information is distributed to at least the DR, although the access information may also be distributed to other devices, such as a rendezvous point (RP) device and various intermediate PIM devices between the RP and the DR. The DR uses the access information to authenticate the host and establish a security agreement with the host. Other devices may use the access information to authenticate the host in the event that the DR is unable to authenticate the host. An authenticated host is added to the shared tree, while a host that cannot be authenticated is prevented from joining the shared tree.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

Figure 1:
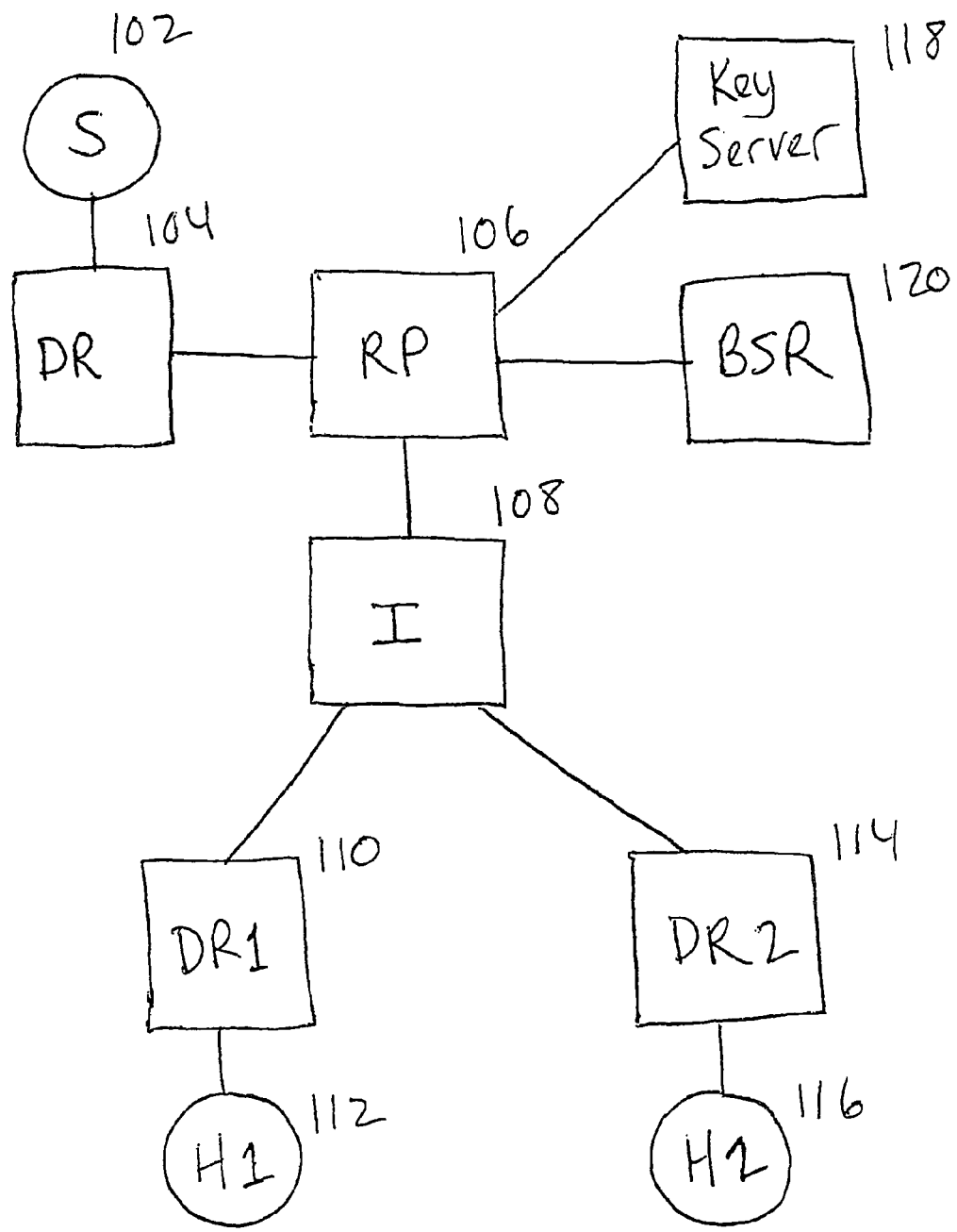
FIG. 1 is a network diagram showing an exemplary PIM communication network in accordance with an embodiment of the present invention.

An embodiment of the present invention uses a distributed host authentication scheme to prevent unauthorized hosts from joining the shared tree. This distributed host authentication scheme is in addition to data encryption and control message authentication.

In the distributed host authentication scheme of an embodiment of the present invention, host authentication is performed by an access device through which the host accesses the shared tree. Specifically, an authorized host obtains access information for joining a particular multicast group, for example, from a key server. The access information includes, among other things, an authentication key. Certain access information, including the authentication key, is also sent to the access device, for example, by the key server. Before allowing the host to join the shared tree, the access device authenticates the host using the access information, for example, when the host sends an IGMP join request to the access device. The host and the access device may also establish a security agreement using the access information. The security agreement defines various security parameters for subsequent communications between the host and the access device.

Various aspects of the present invention are described herein with reference to a Protocol Independent Multicast (PIM) communication network. PIM is a well-known protocol for routing multicast packets within a multicast routing domain. PIM is so named because it is not dependent upon any particular unicast routing protocol for setting up a multicast distribution tree within the multicast routing domain. PIM has two modes of operation, specifically a sparse mode and a dense mode. NM Sparse Mode (PIM-SM) is described in Estrin et al., Internet Engineering Task Force (IETF) Request For Comments (RFC) 2362, *Protocol Independent Multicast—Sparse Mode (PIM-SM): Protocol Specification* (June 1998), which is hereby incorporated herein by reference in its entirety. PIM Dense Mode (PIM-DM) is described in Deering et al., Internet Engineering Task Force (IETF) Internet Draft draft-ietf-pim-v2-dm-03.txt, *Protocol Independent Multicast Version 2 Dense Mode Specification* (Jun. 7, 1999), which is hereby incorporated herein by reference in its entirety.

In accordance with the PIM protocol, the various routers within a particular PIM domain establish a default multicast distribution tree, referred to as a "shared tree," for each multicast group. Each shared tree is rooted at a Rendezvous Point (RP) router (i.e., the central device) that acts as the distribution point of all multicast packets for the multicast group. Before a router can join the shared tree for a particular multicast group, the router must learn the identity of the multicast group RP router. A router learns the identity of the multicast group RP router by receiving a PIM Bootstrap Message including a list of all RP routers in the PIM domain. The router receives the PIM Bootstrap Message either from a Bootstrap Router (BSR), which sends the PIM Bootstrap Message to all routers in the PIM domain at predetermined intervals (typically every 60 seconds), or from a neighboring router, which sends the PIM Bootstrap Message to the router if and only if the neighboring router has lost contact with the router for a predetermined period of time (typically 105 seconds). Upon learning the identity of the multicast group RP router, or at any time thereafter, each router that supports a downstream multicast group member (i.e., multicast client) joins the shared tree by sending a PIM Join/Prune Message hop-by-hop toward the multicast group RP router. Each intermediate router that receives the PIM Join/Prune Message from a downstream router also joins the shared tree by forwarding the PIM Join/Prune Message toward the multicast group RP router.

Typically, a PIM router joins the shared tree when a downstream multicast client joins the shared tree. Specifically, each host accesses the shared tree through a PIM router that is referred to as the Designated Router (DR) for that host (i.e., the access device). The host and the DR support a multicast group management protocol, such as IGMP. In order to join the shared tree, the host sends a join request to the DR using the multicast group management protocol, and the DR forwards a PIM join message upstream towards the RP. Each PIM router that receives the PIM join message establishes the appropriate multicast routes for routing multicast packets to the host, and also joins the shared tree (if it is not already joined to the shared tree) by forwarding the PIM join message upstream towards the RP.

Data encryption may be used to prevent unauthorized hosts from accessing multicast data. For data encryption, a group-wide encryption key (referred to hereinafter as the "group key") is used to encrypt and decrypt all multicast data for a particular multicast group. The group key is distributed to the multicast source as well as to all authorized multicast clients (hosts). The multicast source uses the group key to encrypt the multicast data, while all authorized multicast clients use the group key to decrypt the multicast data. Unauthorized hosts that receive the encrypted multicast data are unable to decrypt the multicast data, and are therefore prevented from accessing the multicast data.

Authentication may be used to prevent unauthorized routers from joining the PIM shared tree. For PIM authentication, all PIM control messages are authenticated hop-by-hop from the DR to the RP, as described in Wei, Internet Engineering Task Force (IETF) Internet Draft draft-ietf-pim-v2-auth-00.txt, *Authenticating PIM Version 2 Messages* (Nov. 11, 1998), which is hereby incorporated herein by reference in its entirety. PIM authentication is performed using IPsec AH and a symmetric encryption key that is shared by all routers in the PIM domain (referred to hereinafter as the "equal-opportunity key"), as described in Kent et al., Internet Engineering Task Force (IETF) Request for Comments (RFC) 2401, *Security Architecture for the Internet Protocol* (November 1998), which is hereby incorporated herein by reference in its entirety. By authenticating all PIM control messages, only authorized PIM routers are able to join the shared tree.

FIG. 1 shows an exemplary PIM communication network 100. The exemplary PIM communication network 100 includes key server (118), BSR (120), RP (106), intermediate PIM router (108), multicast source S (102), two multicast hosts H1 (112) and H2 (116), and three designated routers DR (104), DR1 (110), and DR2 (114). The multicast source S (102) accesses the shared tree via DR (104). The multicast host H1 (112) accesses the shared tree via DR1 (110). The multicast host H2 (116) accesses the shared tree via DR2 (114). The three designated routers DR (104), DR1 (110), and DR2 (114) are coupled through RP (106) and the intermediate PIM router (108).

In an exemplary embodiment of the present invention, an authorized host is allocated certain access information, including, among other things, an authentication key, that can be used to identify and authenticate the host. Some access information, including the authentication key, is also distributed to at least the DR associated with the host. The when the host sends an IGMP join request to the DR to join the shared tree for a particular multicast group. If the IGMP join request is authentic, then a security agreement is established between the host and the DR for protecting subsequent control message exchanges between the host and the DR, and the DR joins the PIM shared tree by sending a PIM join message upstream toward the RP. If the IGM join request is not authentic, then the DR rejects the IGMP join request without joining the PIM shared tree.

The access information is distributed to the host over a secure communication channel. The access information is typically distributed to the host using a key distribution protocol that is scalable, secure, and independent of the underlying unicast and multicast routing protocols. Because the host already uses a group key management (GKM) protocol to obtain a group key for data encryption from a secure key server, it is preferable for the host to also use the GKM protocol to obtain the access information from the key server. Specifically, the host uses the GKM protocol to request the group key from the key server. Upon receiving the request from the host using the GKM protocol, the key server authenticates the host and, assuming the host is authorized to receive the group key, generates an access token including the access information for the host and sends both the group key and the access token to the host using the GKM protocol.

Figure 2:
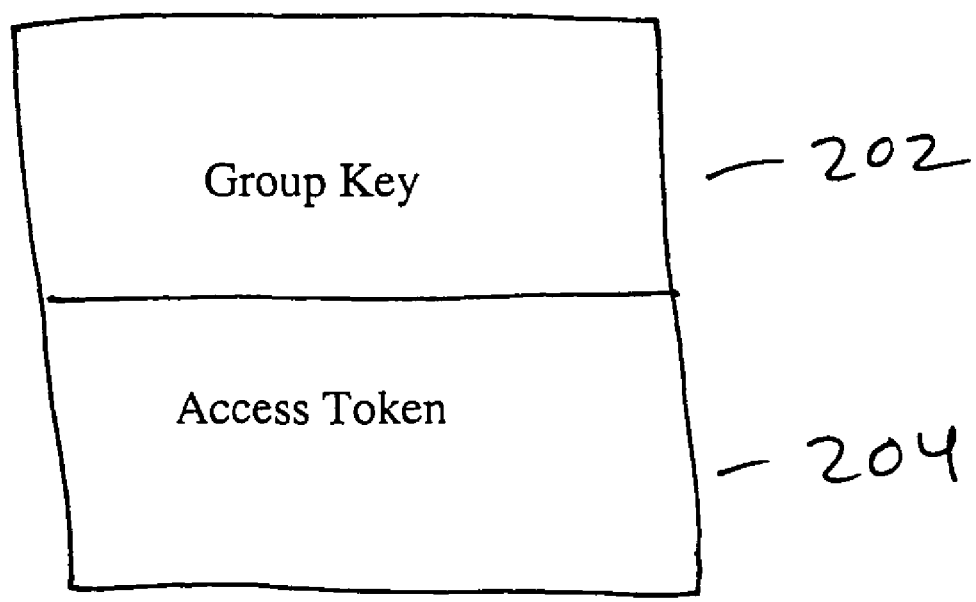
FIG. 2 is a communication message diagram showing the relevant fields of an exemplary GKM message for distributing access information to the host in accordance with an embodiment of the present invention.

FIG. 2 shows the relevant fields of an exemplary GKM message 200 for distributing the access information to the host. The GKM message 200 includes, among other things, a group key 202 and an access token 204. The group key 202 is an encryption key that is used by the multicast source for encrypting multicast data and by the multicast clients (hosts) for decrypting multicast data. The access token 204 includes access information for a particular host to access a particular multicast group. The GKM message 200 is sent by the key server 118 to the host over a secure communication channel.

Figure 3:
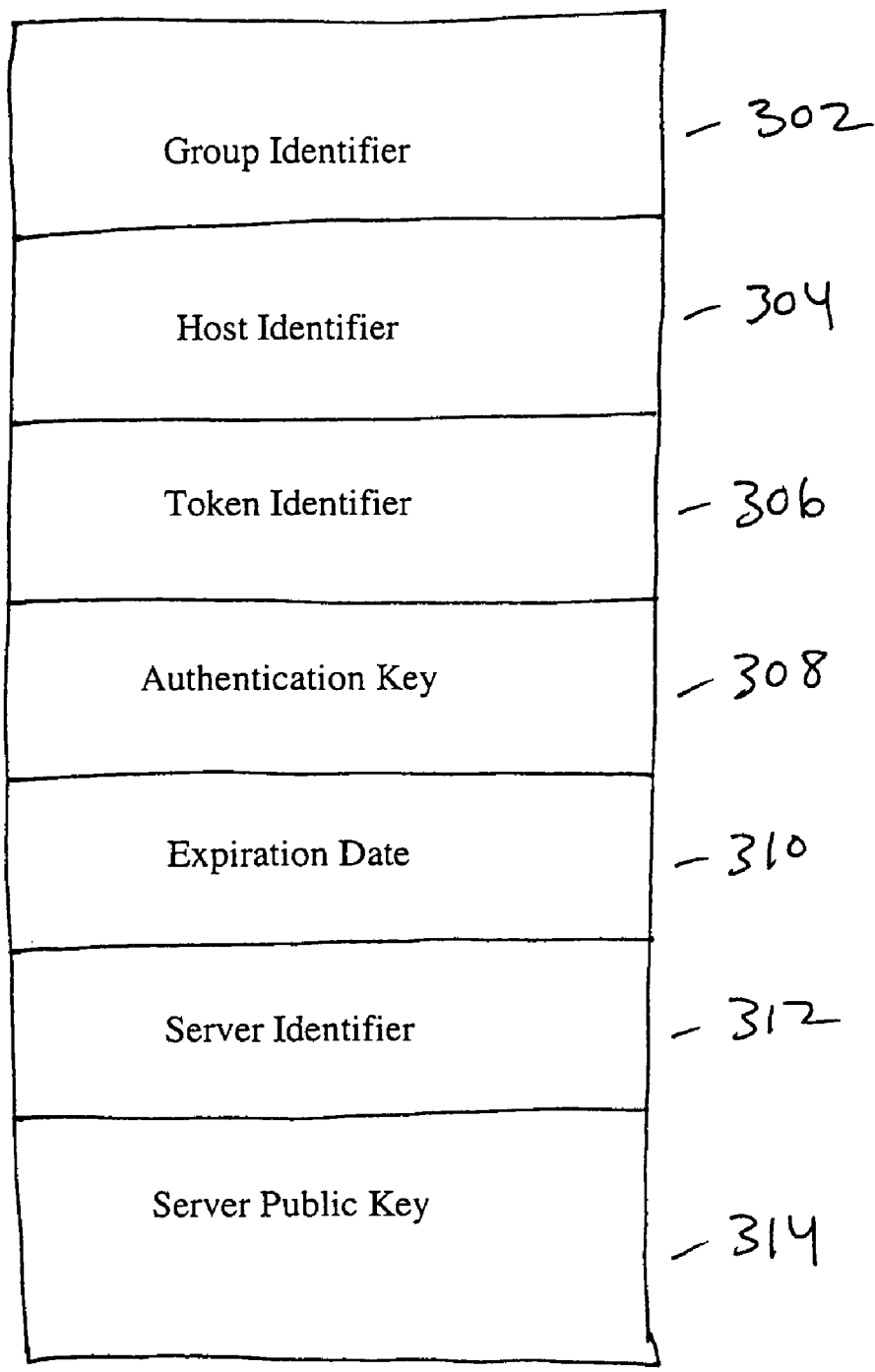
FIG. 3 is a block diagram showing the fields of an exemplary access token in accordance with an embodiment of the present invention.

FIG. 3 shows the fields of an exemplary access token 204. The access token 204 includes a group identifier 302, a host identifier 304, a token identifier 306, an authentication key 308, an expiration date 310, a server identifier 312, and a server public key 314. The group identifier 302 identifies the multicast group to which the access token applies. The token identifier 306 is a random 32-bit number that identifies the access token 204. The authentication key 308 is a symmetric encryption key that is used to authenticate the host and establish a security agreement between the host and the DR. The expiration date 310 indicates an expiration (i.e., use by) date for the access token 204. The server identifier 312 identifies the key server that generated the access token 204 (which, in this example, is the key server 118). The server public key 314 is a cryptographic public key associated with the key server identified by the server identifier 312.

It should be noted that the access token 204 is for a particular host to access a particular multicast group. In other words, the access token 204 corresponds to a particular host/group pair. The host must obtain a different access token for each multicast group that it joins.

Certain access information is also distributed to at least the DR over a secure communication channel. This access information typically includes at least the group identifier, token identifier, and authentication key, but may include other access information such as the host identifier, expiration date, server identifier, and/or server public key.

In an exemplary embodiment of the present invention, the key server 118 periodically distributes access information for various host/group pairs to all PIM routers in a particular PIM domain or subnetwork that includes the DR, preferably using a multicast distribution mechanism. Specifically, a special multicast group (referred to hereinafter as the "all routers group") is established for all multicast routers in a particular PIM domain or subnetwork, and all multicast routers in the all routers group join the multicast distribution tree. The key server 118 distributes a special encryption key (referred to hereinafter as the "router key") to all routers in the all routers group, for example, using public key encryption, and uses the router key to encrypt access information. The encrypted access information is then distributed to the all routers group. The multicast routers in the all routers group use the router key to decrypt the access information. Each multicast router maintains the access information in an access information database that includes access information for various host/group pairs.

Figure 4:
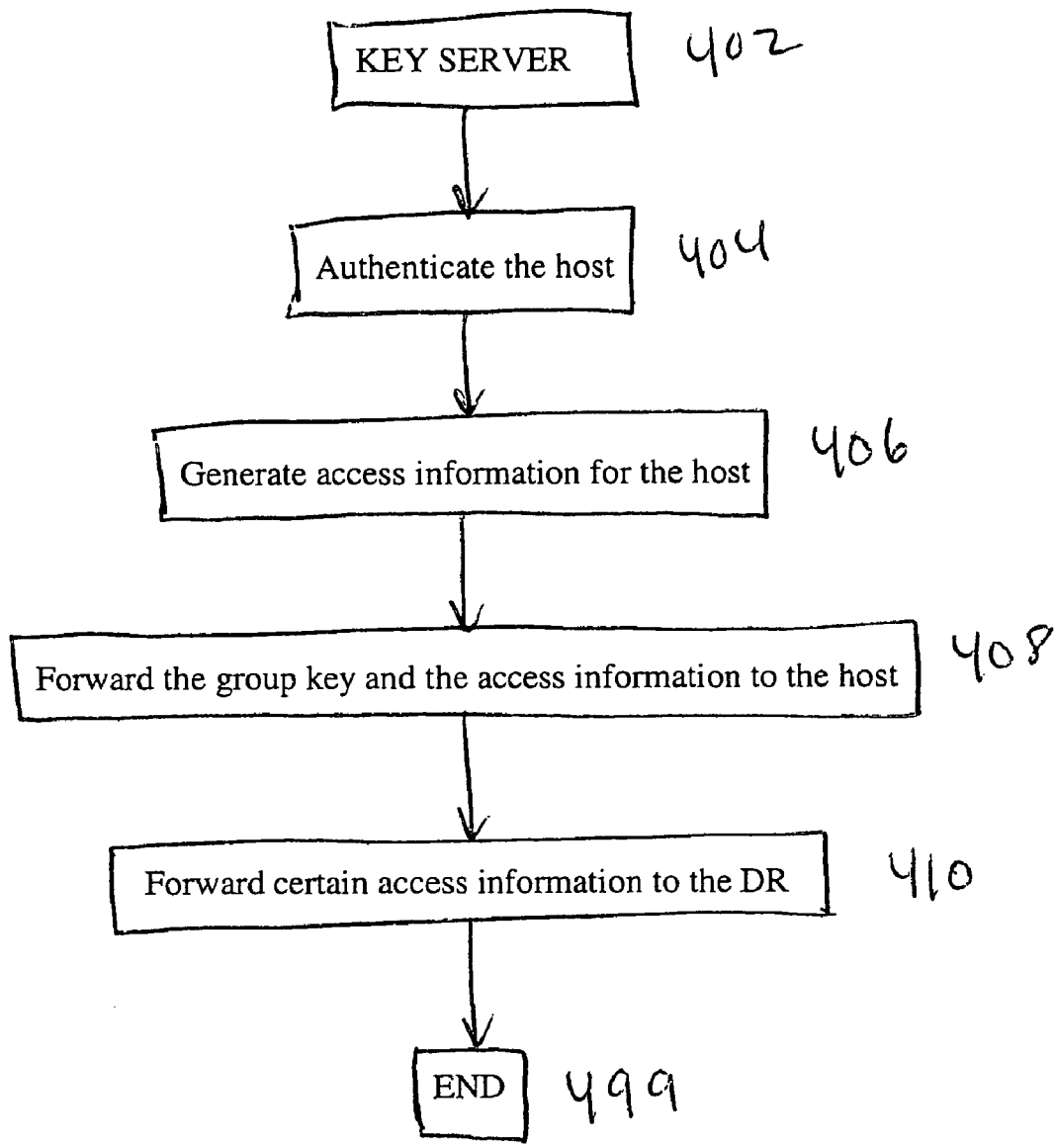
FIG. 4 is a logic flow diagram showing exemplary key server logic in accordance with an embodiment of the present invention.

Thus, when the host requests a group key from the key server 118, the key server 118 authenticates the host, generates access information for the host, and sends access information to both the host and the DR. FIG. 4 shows exemplary key server logic 400 for distributing access information. Beginning at block 402, and upon receiving a request from the host, the logic authenticates the host, in block 404, to determine whether the host is authorized to access the shared tree. Assuming the host is authorized to access the shared tree, the logic then generates access information for the host, in block 406. The logic sends the group key and the access information to the host, in block 408, for example, using the GKM protocol over a secure communication channel. The logic also sends certain access information to the DR, in block 410, for example, using a unicast or multicast distribution mechanism. The key server logic 400 terminates in block 499.

After obtaining access information for a particular multicast group, the host attempts to join the shared tree for the multicast group. Specifically, the host checks the expiration date for the access token to determine whether or not the access token has expired. If the access token has not expired, then the host sends a join request to the DR including the token identifier for the access token. If the access token has expired, then the host obtains a new access token from the key server 118 by sending a request to the key server 118 for a group key, and then sends a join request to the DR including the token identifier for the new access token.

Figure 5:
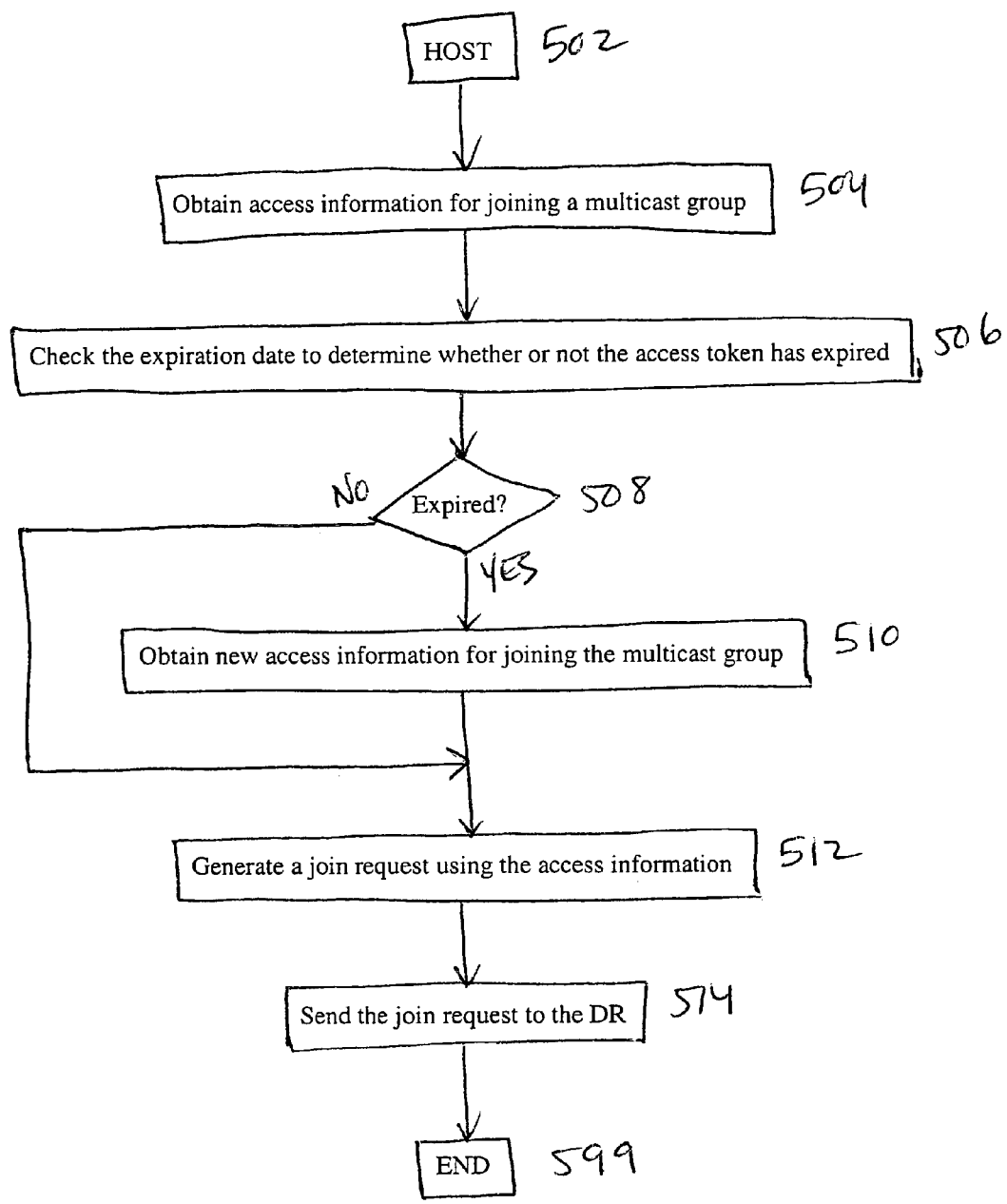
FIG. 5 is a logic flow diagram showing exemplary host logic in accordance with an embodiment of the present invention.

FIG. 5 shows exemplary host logic 500 for joining the shared tree. Beginning at block 502, and upon obtaining access information for the multicast group, in block 504, the logic checks the expiration date to determine whether or not the access token has expired, in block 506. If the access token has not expired (NO in block 508), then the logic generates a join request using the access information, in block 512, and sends the join request to the DR, in block 514. If the access token has expired (YES in block 508), then the logic obtains new access information for joining the multicast group, in block 510, generates a join request using the new access information, in block 512, and sends the join request to the DR, in block 514. The join request includes a token identifier for the access information. The logic 500 terminates in block 599.

When the DR receives a join request from the host including a token identifier, the DR uses the token identifier to obtain access information for the host/group pair from its access information database. The access information typically includes, among other things, the group identifier and the authentication key. The access information may also include the expiration date for the access token, in which case the DR checks the expiration date and rejects the join request if the access token has expired. Assuming the access token has not expired, then the DR authenticates the join request using the authentication key, for example, using IPsec AH. Assuming the join request is authentic, then the DR uses the authentication key to establish a security agreement with the host, which typically involves establishing a symmetric encryption key for protecting subsequent communications between the host and the DR. The DR also forwards a PIM join request upstream toward the RP and joins the shared tree on behalf of the host.

Figure 6:
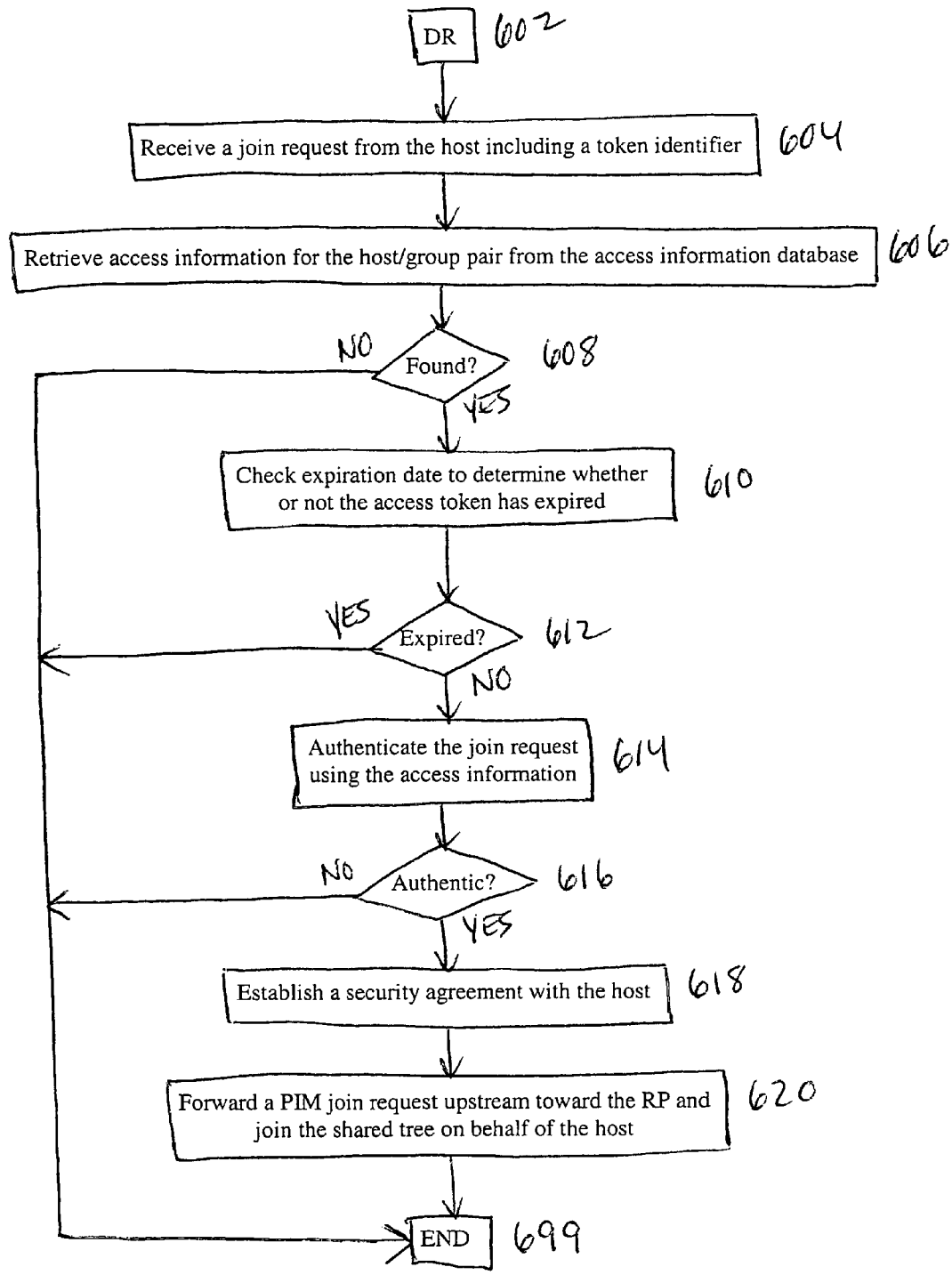
FIG. 6 is a logic flow diagram showing exemplary designated router logic for joining the shared tree in accordance with an embodiment of the present invention.

FIG. 6 shows exemplary DR logic for joining the shared tree. Beginning at block 602, and upon receiving a join request from the host including a token identifier, in block 604, the logic retrieves access information for the host/group pair from the access information database based upon the token identifier, in block 606. If the logic fails to find the access information in the access information database (NO in block 608), then the logic terminates in block 699 without adding the host to the shared tree. If the logic finds the access information in the access information database (YES in block 608), then the logic may check the expiration date for the access token to determine whether or not the access token has expired, in block 610. If the access token has expired (YES in block 612), then the logic terminates in block 699 without adding the host to the shared tree. If the access token has not expired (NO in block 612), then the logic authenticates the join request using the access information, in block 614. If the join request is not authentic (NO in block 616), then the logic terminates in block 699 without adding the host to the shared tree. If the join request is authentic (YES in block 616), then the logic may establish a security agreement with the host using the access information, in block 618. The logic also forwards a PIM join request upstream toward the RP and joins the shared tree on behalf of the host, in block 620. The logic 600 terminates at block 699.

In the exemplary embodiments described above, certain access information for a particular host/group pair is distributed by the key server 118 to all multicast routers in a PIM domain or subnetwork using a multicast distribution mechanism. However, the present invention is in no way limited to distributing the access information to all multicast routers in a PIM domain or subnetwork using a multicast distribution mechanism. The access information may be distributed to one or more multicast routers using any means, including unicast, multicast, and broadcast distribution mechanisms.

Thus, for example, the key server 118 may distribute the access information to an individual multicast router using a unicast distribution mechanism. Specifically, a secure communication channel is established between the key server 118 and the multicast router. The key server 118 then downloads the access information to the multicast router over the secure communication channel.

The key server 118 may also distribute the access information to one or more individual multicast routers using a broadcast distribution mechanism. Specifically, the key server 118 encrypts the access information, for example, using a router key, and broadcasts the encrypted access information. Many network devices may receive the broadcast messages. However, only multicast routers that have the router key can decrypt the access information.

The access information may also be distributed from router to router through the use of control messages sent between neighboring routers. The multicast routers typically support a multicast routing protocol (e.g., PIM) that enables each multicast router to identify and communicate with its neighboring multicast router(s). The access information may be propagated from router to router using the multicast routing protocol, and specifically using inter-router control messages. For example, a multicast router may forward the access information to one or more downstream neighboring routers upon receiving the access information from an upstream neighboring router.

When the key server 118 distributes access information to the multicast routers, for example, using the multicast distribution mechanism described herein, it is possible for one or more multicast routers to fail to receive the access information. Thus, a particular multicast router may have obsolete (expired) access information for a particular host/group pair. The multicast routers typically delete any obsolete (expired) access information from their respective access information databases.

Thus, when the DR receives a join request from the host, the DR may or may not have access information for authenticating the join request. If the DR has no access information for the host/group pair or has obsolete access information for the host/group pair, then the DR is unable to authenticate the join request, and therefore the host is unable to join the shared tree.

One solution is for the DR to dynamically obtain access information for the host/group pair, for example, by sending a request to the key server 118 upon receiving the join request from the host. The DR may include the token identifier from the join request in its request to the key server 118, in which case the key server 118 sends access information for the identified access token if such access information is available. In this way, the multicast router obtains the most recent access information when it is needed.

Figure 7:
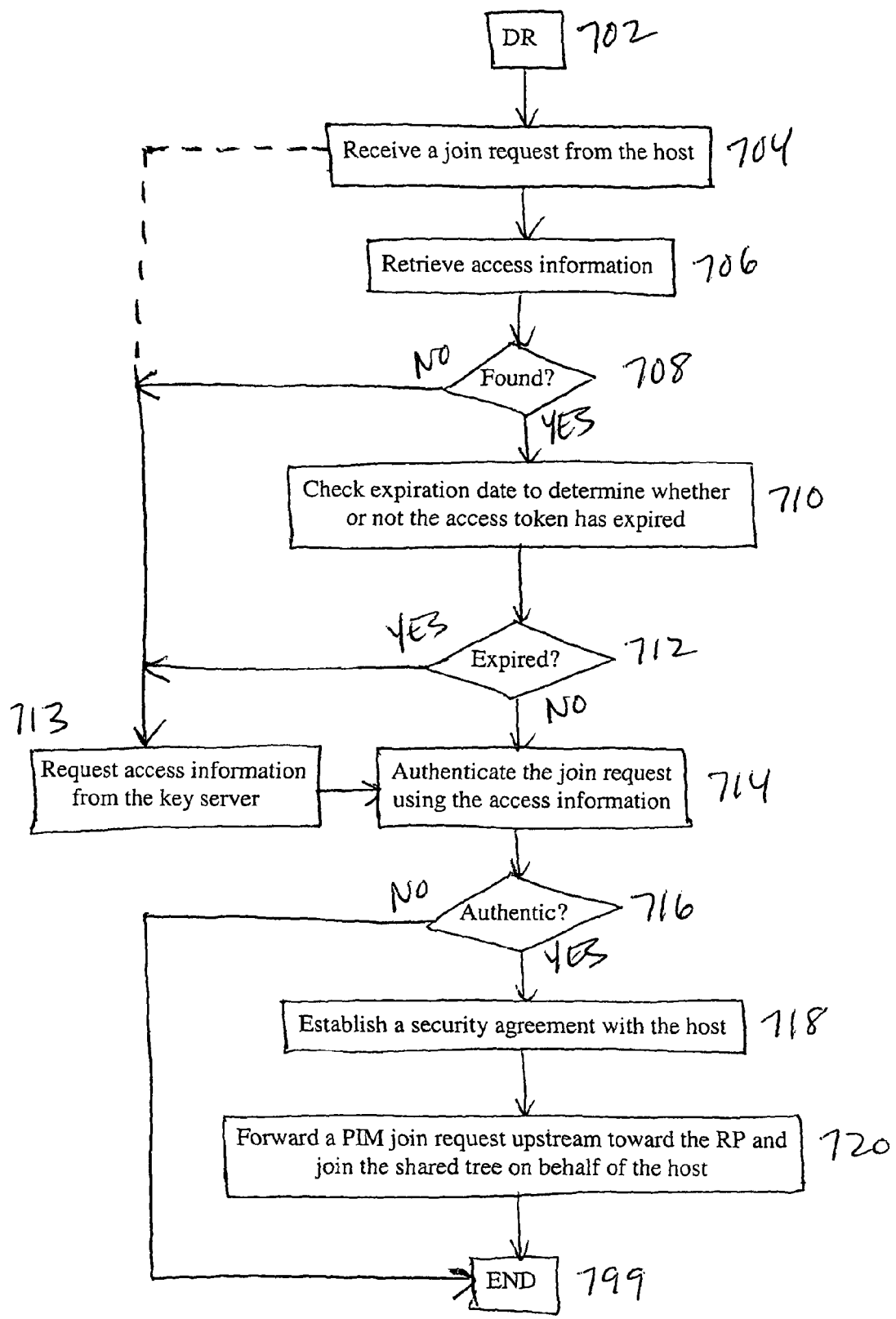
FIG. 7 is a logic flow diagram showing exemplary designated router logic in accordance with an embodiment of the present invention using an "on demand" mechanism for obtaining access information by the designated router.

FIG. 7 shows exemplary DR logic 700 for joining the shared tree using an "on demand" mechanism for obtaining access information. Beginning at block 702, and upon receiving a join request from the host including a token identifier, in block 704, the logic retrieves access information for the host/group pair from the access information database based upon the token identifier, in block 706. If the logic fails to find the access information in the access information database (NO in block 708), then the logic requests access information from the key server, in block 713, and proceeds to block 714. If the logic finds the access information in the access information database (YES in block 708), then the logic may check the expiration date for the access token to determine whether or not the access token has expired, in block 710. If the access token has expired (YES in block 712), then the logic requests access information from the key server, in block 713, and proceeds to block 714. If the access token has not expired (NO in block 712), then the logic proceeds to block 714.

In block 714, the logic authenticates the join request using the access information. If the join request is not authentic (NO in block 716), then the logic terminates in block block 716), then the logic may establish a security agreement with the host using the access information, in block 718. The logic also forwards a PIM join request upstream toward the RP and joins the shared tree on behalf of the host, in block 720. The logic 700 terminates at block 799.

It should be noted that such an "on demand" mechanism for distributing access information may be used as the sole means of distributing access information, such that the key server 118 need not periodically distribute the access information to the multicast routers. Thus, with reference again to FIG. 7, the logic may proceed directly to block 713 upon receiving the join request from the host, in block 704, as shown by the dashed line from block 704 to block 713.

Another solution is for the DR to forward the join request upstream toward the RP, and for each upstream multicast router to attempt to authenticate the join request using the access information in its access information database. If a multicast router successfully authenticates the join request, then the host (along with any intermediate multicast routers) are added to the shared tree. If a multicast router is unable to authenticate the join request, then the multicast router forwards the join request upstream toward the RP. The RP provides the last chance for the join request to be authenticated.

Figure 8:
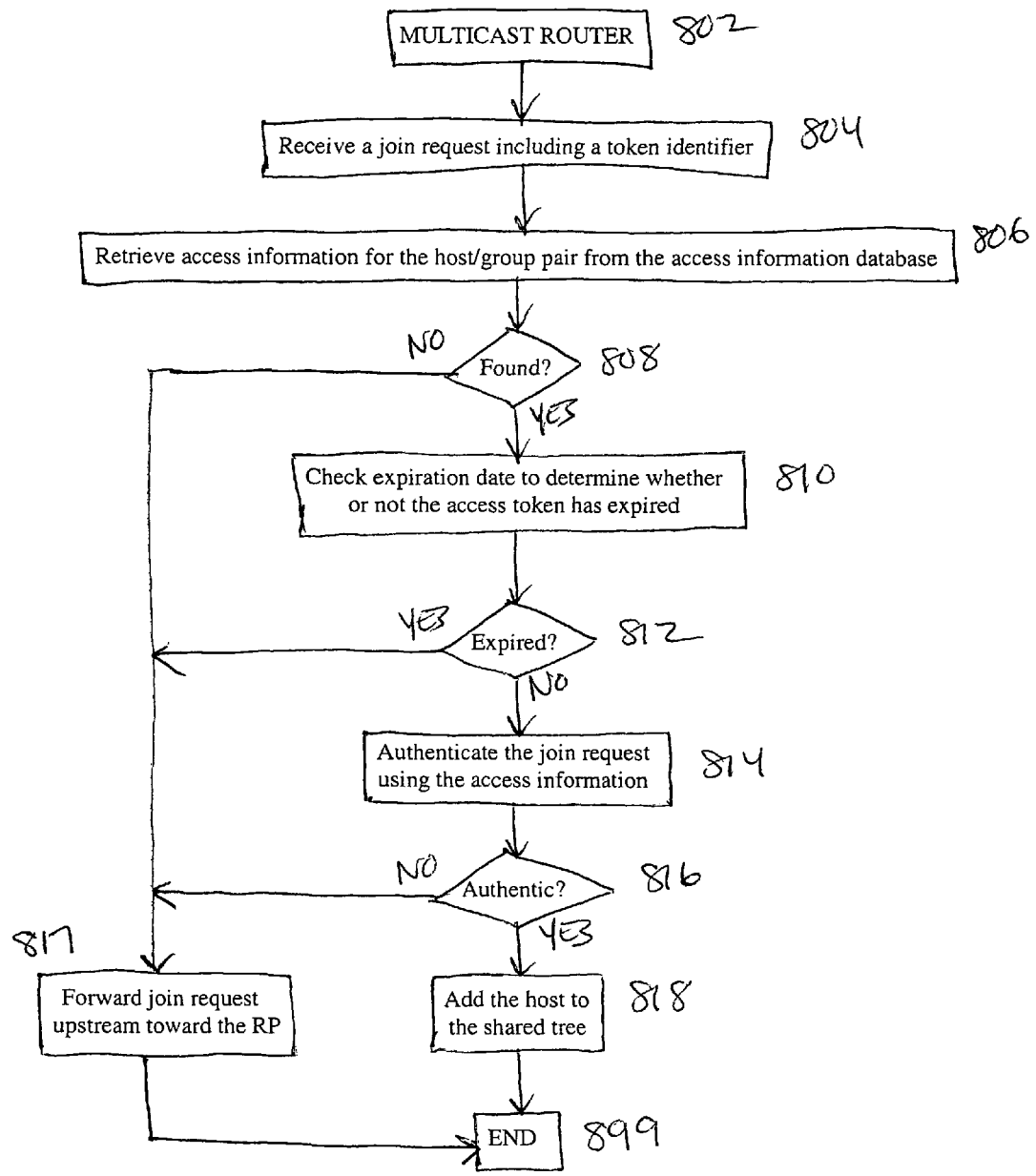
FIG. 8 is a logic flow diagram showing exemplary multicast router logic for authenticating a join request in accordance with an embodiment of the present invention.

FIG. 8 shows exemplary multicast router logic for authenticating the join request. Beginning at block 802, and upon receiving a join request from the host including a token identifier, in block 804, the logic retrieves access information for the host/group pair from the access information database based upon the token identifier, in block 806. If the logic fails to find the access information in the access information database (NO in block 808), then the logic forwards the join request upstream toward the RP, in block 817. If the logic finds the access information in the access information database (YES in block 808), then the logic may check the expiration date for the access token to determine whether or not the access token has expired, in block 810. If the access token has expired (YES in block 812), then the logic forwards the join request upstream toward the RP, in block 817. If the access token has not expired (NO in block 812), then the logic authenticates the join request using the access information, in block 814. If the join request is not authentic (NO 817. If the join request is authentic (YES in block 816), then the logic may establish a security agreement with the host using the access information, in block 818. The logic also forwards a PIM join request upstream toward the RP and joins the shared tree on behalf of the host, in block 820. The logic 800 terminates at block 899.

It should be noted that the term "router" is used herein to describe a communication device that may be used in a communication system, and should not be construed to limit the present invention to any particular communication device type. Thus, a communication device may include, without limitation, a bridge, router, bridge-router (brouter), switch, node, or other communication device.

It should also be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

It should also be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), Gate Array (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor within the corresponding communication device (host, key server, DR, multicast router, RP) under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA™, or HTML) for use with various operating system or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies, networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Thus, the present invention may be embodied as a communication system including a plurality of multicast devices forming a shared multicast distribution tree, a host device, and a designated device through which the host device accesses the shared tree. The host device obtains access information for the host device to access the shared tree. The designated device obtains the access information for the host device to access the shared tree. The host device sends an access control message to the designated device to join the shared tree. The designated device uses the access information to authenticate the host device before adding the host device to the shared tree. The communication system may also include a key server for authenticating the host device and generating the joins the shared tree on behalf of the host device upon authenticating the host device. The designated device may forward the access control message to a neighboring device upon failing to authenticate the host device using the access information, in which case the neighboring device obtains the access information and authenticates the host device using the access information.

The present invention may also be embodied as a key server logic for authenticating a host device, generating access information for the host device to join a multicast group, sending the access information to the host device, and sending the access information to a designated device for the host device.

The present invention may also be embodied as host logic for obtaining access information for joining a multicast group from an access information server, generating an access control message for joining the multicast group using the access information, and sending the access control message to a designated device for joining the multicast group. The logic may also establish a security agreement with the designated device using the access information.

The present invention may also be embodied as designated device logic for receiving an access control message from a host device, determining whether the host device is authorized to access a shared multicast distribution tree based upon access information for the host device, and joining the shared tree on behalf of the host device if the host device is determined to be authorized to access the shared tree. The designated device may obtain the access information before or after receiving the access control message. The designated device may search for the access information for the host device in an access information database. The designated device may determine whether or not the access information for the host device is expired based upon an expiration date. The designated device may authenticate the host using the access information and a predetermined authentication scheme. The designated device may forward the access control message to a neighboring device if the designated device determines that the host is not authorized to access the shared tree or the designated device is unable to determine whether or not the host is authorized to access the shared tree.

The present invention may also be embodied as a communication message having a group key for a multicast group and access information for a host device.

The present invention may also be embodied as an access control message including access information for a host device.

The present invention may be embodied in other specific forms without departing from the true scope of the invention. The described embodiments are to be considered in all respects only as illustrative and not restrictive.

We claim:

1. A communication system comprising:
a plurality of multicast devices forming a shared multicast distribution tree;
a host device with a processor;
a key server; and
a designated device with a processor, separate from the key server, through which the host device requests access to the shared tree associated with a group, wherein:
the host device obtains access information from the key server for the host device to enable the host device to request access to the shared tree associated with the group, the access information including authentication information unique to the host device/group pair, the authentication information including an access token comprising a host identifier, a token identifier and an authentication key for authenticating the host with the designated device;
the designated device obtains the access information associated with the host device/group pair from the key server for enabling the host device to access the shared tree;
the host device sends an access control message to the designated device to join the shared tree; and
the designated device uses the access information to authenticate the host device before adding the host device to the shared tree, including using the token identifier to obtain a group identifier and authentication key from memory in order to verify authentication of the host device.

2. The communication system of claim 1, wherein the key server includes logic for authenticating the host device and generating the access information for the host device to access the shared tree.

3. The communication system of claim 2, wherein the key server provides the access information to the host device over a secure communication channel.

4. The communication system of claim 2, wherein the key server provides the access information to the designated device using a unicast distribution mechanism.

5. The communication system of claim 2, wherein the key server provides the access information to the designated device using a multicast distribution mechanism.

6. The communication system of claim 2, wherein the key server provides the access information to the designated device using a broadcast distribution mechanism.

7. The communication system of claim 2, wherein the designated device requests the access information from the key server upon receiving the access control message.

8. The communication system of claim 2, wherein the key server provides the access information to the plurality of multicast devices forming the shared tree.

9. The communication system of claim 1, wherein the access control message comprises the token identifier.

10. The communication system of claim 9, wherein the access control message is an Internet Group Management Protocol (IGMP) join request including the token identifier.

11. The communication system of claim 1, wherein the designated device joins the shared tree on behalf of the host device upon authenticating the host device.

12. The communication system of claim 11, wherein the shared tree is a Protocol Independent Multicast (PIM) shared tree, and wherein the designated device sends a PIM join request upstream toward a rendezvous point device in order to join the shared tree on behalf of the host device upon authenticating the host device.

13. The communication system of claim 1, wherein the designated device forwards the access control message to a neighboring device upon failing to authenticate the host device using the access information.

14. The communication system of claim 13, wherein the neighboring device obtains the access information and authenticates the host device using the access information.

15. A method performed at a key server comprising:
authenticating a host device for entry into a multicast group;
generating access information by the key server for the host device to join the multicast group, the access information including authentication information unique to the host device/multicast group pair, the authentication information including an access token comprising a host identifier, a token identifier and an authentication key for authenticating the host with the designated device;
sending the access information to the host device; and
sending the access information to a separate designated device through which the host device gains access to a shared multicast distribution tree, the token identifier being used by the designated device to obtain a group identifier and authentication key from memory in order to verify authentication of the host device.

16. The method of claim 15, wherein the access information further comprises an expiration date for the access token.

17. The method of claim 15, wherein the access information further comprises a public key.

18. The method of claim 15, wherein sending the access information to the host device comprises:
sending a communication message including the access information to the host device over a secure communication channel.

19. The method of claim 18, wherein the communication message is a group key management communication message.

20. The method of claim 15, wherein sending the access information to the designated device for the host device comprises:
sending a communication message including the access information to the designated device over a secure communication channel.

21. The method of claim 20, wherein the communication message is a unicast communication message addressed to the designated device.

22. The method of claim 20, wherein the communication message is a multicast communication message addressed to a multicast group of which the designated device is a member.

23. The method of claim 20, wherein the communication message is a broadcast communication message.

24. The method of claim 15, wherein the access token comprises:
a group identifier for identifying a multicast group;
a host identifier for identifying the host device;
an expiration date for the access token;
a server identifier for identifying a key server; and
a public key for the key server.

25. A method performed at a host device comprising:
obtaining access information from a key server for joining a multicast group, the access information including authentication information unique to the host device/group pair, the authentication information including an access token comprising a host identifier, a token identifier and an authentication key for authenticating the host with the designated device;
generating an access control message for joining the multicast group using the access information; and
sending the access control message to a designated device separate from the key server for enabling the host device to join the multicast group, the token identifier being used by the designated device to obtain a group identifier and authentication key from memory in order to verify authentication of the host device.

26. The method of claim 25, further comprising:
generating authentication information using the access information; and sending the authentication information to the designated device.

27. The method of claim 26, wherein generating the authentication information using the access information comprises generating a digital signature using the access information and a predetermined digital signature scheme.

28. The method of claim 27, wherein the predetermined digital signature scheme comprises a keyed hash function.

29. The method of claim 28, wherein the keyed hash function comprises IPsec AH with Keyed-Hashing for Message Authentication using Message Digest 5 (HMAC-MD5).

30. The method of claim 28, wherein the keyed hash function comprises IP with Keyed-Hashing for Message Authentication using a Secure Hash Algorithm (HMAC-SHA-1).

31. The method of claim 25, wherein the access information further comprises an expiration date for the access token.

32. The method of claim 31, wherein generating the access control message using the access information comprises:
including the token identifier in the access control message.

33. The method of claim 32, wherein the access control message is an Internet Group Management Protocol (IGMP) join request message including the token identifier.

34. The method of claim 25, further comprising:
establishing a security agreement with the designated device using the access information.

35. A method performed at a designated device that controls access to a shared multicast tree comprising:
receiving an access control message from a host device;
determining whether the host device is authorized to request access to a shared multicast distribution tree associated with a group based upon access information for the host device, the access information including authentication information unique to the host device/ group pair and being received by the designated device from a separate key server, the authentication information including a host identifier, an access token comprising a token identifier and an authentication key for authenticating the host with the designated device, the token identifier being used by the designated device to obtain a group identifier and authentication key from memory in order to verify authentication of the host device; and joining the shared tree on behalf of the host device if the host device is determined to be authorized to request access to the shared tree.

36. The method of claim 35, further comprising:
obtaining the access information for the host device.

37. The method of claim 36, wherein obtaining the access information for the host device comprises:
receiving the access information from an access information server prior to receiving the access control message from the host device.

38. The method of claim 36, wherein obtaining the access information for the host device comprises:
requesting the access information from an access information server after receiving the access control message from the host device.

39. The method of claim 35, wherein determining whether the host device is authorized to access the shared tree comprises:
maintaining an access information database;
searching the access information database for the access information for the host device;
failing to find the access information for the host device in the access information database; and
determining that the host device is not authorized to access the shared tree.

40. The method of claim 35, wherein determining whether the host device is authorized to access the shared tree comprises:
maintaining an access information database;
searching the access information database for the access information for the host device;
failing to find the access information for the host device in the access information database; and
forwarding the access control message to a neighboring device.

41. The method of claim 35, wherein the access control message includes the token identifier.

42. The method of claim 35, wherein the access information further comprises an expiration date for the access token.

43. The method of claim 42, wherein determining whether the host device is authorized to access the shared tree comprises:
determining that the access token has expired based upon the expiration date for the access token; and
determining that the host device is not authorized to access the shared tree in response to expiration of the access token.

44. The method of claim 42, wherein determining whether the host device is authorized to access the shared tree comprises:
determining that the access token has expired based upon the expiration date for the access token; and
forwarding the access control message to a neighboring device.

45. The method of claim 35, wherein determining whether the host device is authorized to access the shared tree comprises:
authenticating the host device using the access information and a predetermined authentication scheme; and
determining whether the host device is authorized to access the shared tree based upon authenticating the host device using the access information and the predetermined authentication scheme.

46. The method of claim 45, wherein authenticating the host device using the access information and the predetermined authentication scheme comprises:
receiving authentication information from the host device; and authenticating the host device based upon the access information and the authentication information received from the host device.

47. The method of claim 46, wherein the authentication information comprises a digital signature, and wherein authenticating the host device based upon the access information and the authentication information received from the host device comprises:
verifying the digital signature using the access information and a predetermined digital signature scheme.

48. The method of claim 47, wherein the predetermined digital signature scheme comprises a keyed hash function.

49. The method of claim 48, wherein the keyed hash function comprises IPsec AH with Keyed-Hashing for Message Authentication using Message Digest 5 (HMAC-MD5).

50. The method of claim 48, wherein the keyed hash function comprises IPsec AH with Keyed-Hashing for Message Authentication using a Secure Hash Algorithm (HMAC-SHA-1).

51. The method of claim 45, wherein determining whether the host device is authorized to access the shared tree based upon authenticating the host device using the access information and the predetermined authentication scheme comprises:
determining that authentication failed;
determining that the host device is not authorized to access the shared tree.

52. The method of claim 51, further comprising:
forwarding the access control message to a neighboring device.

53. The method of claim 45, wherein determining whether the host device is authorized to access the shared tree based upon authenticating the host device using the access information and the predetermined authentication scheme comprises:
determining that authentication succeeded; and
determining that the host device is authorized to access the shared tree.

54. The method of claim 35, further comprising:
establishing a security association with the host device using the access information upon determining that the host device is authorized to access the shared tree.

55. An apparatus comprising:
authenticating logic operably coupled to authenticate a host device for entry into a multicast group;
access logic, implemented by a processor, operably coupled to generate access information for the host device, the access information including authentication information unique to the host device/multicast group pair, the authentication information including an access token comprising a host identifier, a token identifier and an authentication key for authenticating the host with the designated device; and
distribution logic operably coupled to distribute the access information both to the host device and to a separate designated device for enabling the host device to access a shared multicast distribution tree through the designated device, the token identifier being used by the designated device to obtain a group identifier and authentication key from memory in order to verify authentication of the host device.

56. The apparatus of claim 55 wherein the access token comprises:
a group identifier for identifying a multicast group;
an expiration date for the access token;
a server identifier for identifying a key server; and a public key for a key server.

57. The apparatus of claim 55, wherein the distribution logic comprises:
group key management logic operably coupled to send the access information to the host device.

58. The apparatus of claim 55, wherein the distribution logic comprises:
unicasting logic operably coupled to send the access information to the designated device using a unicast mechanism.

59. The apparatus of claim 55, wherein the distribution logic comprises:
multicasting logic operably coupled to send the access information to the designated device using a multicast mechanism.

60. The apparatus of claim 55, wherein the distribution logic comprises:
broadcasting logic operably coupled to send the access information to the designated device using a broadcast mechanism.

61. A computer program stored on a non-transitory computer-readable storage medium for controlling a key server in a computer system, the computer program comprising:
authenticating logic programmed to authenticate a host device for entry into a multicast group;
access logic programmed to generate access information for the host device, the access information including authentication information unique of the host device/multicast group pair, the authentication information including an access token comprising a host identifier, a token identifier and an authentication key for authenticating the host with the designated device; and
distribution logic programmed to distribute the access information to the host device and to a separate designated device for enabling the host device to access a shared multicast distribution tree through the designated device, the token identifier being used by the designated device to obtain a group identifier and authentication key from memory in order to verify authentication of the host device.

62. The computer program of claim 61 wherein the access token comprises:
a group identifier for identifying a multicast group;
an expiration date for the access token;
a server identifier for identifying a key server; and a public key for a key server.

63. The computer program of claim 61, wherein the distribution logic comprises:
group key management logic programmed to send the access information to the host device.

64. The computer program of claim 61, wherein the distribution logic comprises:
unicasting logic programmed to send the access information to the designated device using a unicast mechanism.

65. The computer program of claim 61, wherein the distribution logic comprises:
multicasting logic programmed to send the access information to the designated device using a multicast mechanism.

66. The computer program of claim 61, wherein the distribution logic comprises:
broadcasting logic programmed to send the access information to the designated device using a broadcast mechanism.

67. An apparatus comprising:
receiving logic operably coupled to receive, from an access information server, access information, the access information enabling the host device to join a multicast group the access information being unique to the host device/multicast group pair, the authentication information including an access token comprising a host identifier, a token identifier and an authentication key for authenticating the host with the designated device; and
access logic, implemented by a processor, operably coupled to generate an access control message for joining the multicast group using the access information and to send the access control message to a designated device separate from the access information server and coupling the host device to the multicast group, the token identifier being used by the designated device to obtain a group identifier and authentication key from memory in order to verify authentication of the host device.

68. The apparatus of claim 67, wherein the access logic is operably coupled to include the token identifier in the access control message.

69. The apparatus of claim 67, wherein the access logic is operably coupled to generate authentication information using the access information and send the authentication information to the designated device.

70. The apparatus of claim 69, wherein the access logic is operably coupled to generate the authentication information by generating a digital signature using the access information and a predetermined digital signature scheme.

71. The apparatus of claim 70, wherein the predetermined digital signature scheme comprises a keyed hash function.

72. The apparatus of claim 71, wherein the keyed hash function comprises IPsec AH with Keyed-Hashing for Message Authentication using Message Digest 5 (HMAC-MD5).

73. The apparatus of claim 71, wherein the keyed hash function comprises IPsec AH with Keyed-Hashing for Message Authentication using a Secure Hash Algorithm (HMAC-SHA-1).

74. The apparatus of claim 67, wherein the access information further comprises an expiration date for the access token.

75. The apparatus of claim 67, wherein the access logic is operably coupled to include the token identifier in the access control message.

76. The apparatus of claim 75, wherein the access control message is an Internet Group Management Protocol (IGMP) join request message including the token identifier.

77. The apparatus of claim 67, wherein the access logic is operably coupled to establish a security agreement with the designated device using the access information.

78. A computer program stored on a non-transitory computer-readable storage medium for controlling a computer system, the computer program comprising:
receiving logic programmed to receive access information for joining a multicast group from an access information server, the access information including authentication information unique to a host device/multicast group pair, the authentication information including an access token comprising a host identifier, a token identifier and an authentication key for authenticating the host with the designated device; and access logic programmed to generate an access control message for joining the multicast group using the access information and to send the access control message to a designated device separate from the access information server and coupling the host device to the multicast group, the token identifier being used by the designated device to obtain a group identifier and authentication key from memory in order to verify authentication of the host device.

79. The computer program of claim 78, wherein the access logic is programmed to include the token identifier in the access control message.

80. The computer program of claim 78, wherein the access logic is programmed to generate authentication information using the access information and send the authentication information to the designated device.

81. The computer program of claim 80, wherein the access logic is programmed to generate the authentication information by generating a digital signature using the access information and a predetermined digital signature scheme.

82. The computer program of claim 81, wherein the predetermined digital signature scheme comprises a keyed hash function.

83. The computer program of claim 82, wherein the keyed hash function comprises IPsec with Keyed-Hashing for Message Authentication using Message Digest 5 (HMAC-MD5).

84. The computer program of claim 82, wherein the keyed hash function comprises IPsec AH with Keyed-Hashing for Message Authentication using a Secure Hash Algorithm (HMAC-SHA-1).

85. The computer program of claim 78, wherein the access information further comprises an expiration date for the access token.

86. The computer program of claim 78, wherein the access logic is programmed to include the token identifier in the access control message.

87. The computer program of claim 86, wherein the access control message is an Internet Group Management Protocol (IGMP) join request message including the token identifier.

88. The computer program of claim 78, wherein the access logic is programmed to establish a security agreement with the designated device using the access information.

89. An apparatus comprising:
receiving logic operably coupled to receive an access control message from a host device, the access control message for permitting the host device to gain access to a multicast group, the access control message including authentication information unique to the host device/multicast group pair, the authentication information including an access token comprising a host identifier, a token identifier and an authentication key for authenticating the host with the designated device;
access logic implemented by a processor operably coupled to determine whether the host device is authorized to access a shared multicast distribution tree based upon access information for the host device stored at the apparatus, the stored access information including authentication information unique to the host device/multicast group pair and being received from a separate key server, the token identifier being used by the designated device to obtain a group identifier and authentication key from memory in order to verify authentication of the host device; and
joining logic implemented by a processor operably coupled to join the shared tree on behalf of the host device if the access logic determines that the host device is authorized to access the shared tree.

90. The apparatus of claim 89, wherein the access logic is operably coupled to obtain the access information for the host device from an access information server.

91. The apparatus of claim 90, wherein the access logic is operably coupled to obtain the access information for the host device from the access information server prior to receiving the access control message from the host device.

92. The apparatus of claim 90, wherein the access logic is operably coupled to obtain the access information for the host device from the access information server after receiving the access control message from the host device.

93. The apparatus of claim 89, further comprising an access information database.

94. The apparatus of claim 93, wherein the access logic is operably coupled to search the access information database for the access information for the host device and determine that the host device is not authorized to access the shared tree upon failing to find the access information for the host device in the access information database.

95. The apparatus of claim 93, wherein the access logic is operably coupled to search the access information database for the access information for the host device and forward the access control message to a neighboring device upon failing to find the access information for the host device in the access information database.

96. The apparatus of claim 89, wherein the access information further comprises an expiration date for the access token.

97. The apparatus of claim 96, wherein the access logic is operably coupled to determine whether the host device is authorized to access the shared tree based upon the expiration date of the access token.

98. The apparatus of claim 97, wherein the access logic is operably coupled to determine that the host device is not authorized to access the shared tree upon determining that the access token has expired.

99. The apparatus of claim 97, wherein the access logic is operably coupled to forward the access control message to a neighboring device upon determining that the access token has expired based upon the expiration date for the access token.

100. The apparatus of claim 89, wherein the access logic is operably coupled to authenticate the host device using the access information and a predetermined authentication scheme.

101. The apparatus of claim 100, wherein the access logic is operably coupled to receive authentication information from the host device and authenticate the host device based upon the access information and the authentication information received from the host device.

102. The apparatus of claim 101, wherein the authentication information comprises a digital signature, and wherein the access logic is operably coupled to verify the digital signature using the access information and a predetermined digital signature scheme.

103. The apparatus of claim 102, wherein the predetermined digital signature scheme comprises a keyed hash function.

104. The apparatus of claim 103, wherein the keyed hash function comprises IPsec AH with Keyed-Hashing for Message Authentication using Message Digest 5 (HMAC-MD5).

105. The apparatus of claim 103, wherein the keyed hash function comprises IPsec AH with Keyed-Hashing for Message Authentication using a Secure Hash Algorithm (HMAC-SHA-1).

106. The apparatus of claim 100, wherein the access logic is operably coupled to determine that the host device is not authorized to access the shared tree upon determining that the authentication failed.

107. The apparatus of claim 106, wherein the access logic is operably coupled to forward the access control message to a neighboring device upon determining that the authentication failed.

108. The apparatus of claim 100, wherein the access logic is operably coupled to determine that the host device is authorized to access the shared tree upon determining that the authentication succeeded.

109. The apparatus of claim 89, wherein the access information is operably coupled to establish a security association with the host device using the access information upon determining that the host device is authorized to access the shared tree.

110. A computer program stored on a non-transitory computer-readable storage medium for controlling a computer system, the computer program comprising:
receiving logic programmed to receive an access control message from a host device to enable the host device to join a multicast group, the access control message including authentication information unique to the host device/multicast group pair, the authentication information including an access token comprising a host identifier, a token identifier and an authentication key for authenticating the host with the designated device;
access logic programmed to determine whether the host device is authorized to access a shared multicast distribution tree based upon stored access information for the host device, the stored access information including authentication information unique to the host device/multicast group pair and being received from a separate key server, the token identifier being used by the designated device to obtain a group identifier and authentication key from memory in order to verify authentication of the host device; and
joining logic programmed to join the shared tree on behalf of the host device if the access logic determines that the host device is authorized to access the shared tree.

111. The computer program of claim 110, wherein the access logic is programmed to obtain the access information for the host device from an access information server.

112. The computer program of claim 111, wherein the access logic is programmed to obtain the access information for the host device from the access information server prior to receiving the access control message from the host device.

113. The computer program of claim 111, wherein the access logic is programmed to obtain the access information for the host device from the access information server after receiving the access control message from the host device.

114. The computer program of claim 110, further comprising an access information database.

115. The computer program of claim 114, wherein the access logic is programmed to search the access information database for the access information for the host device and determine that the host device is not authorized to access the shared tree upon failing to find the access information for the host device in the access information database.

116. The computer program of claim 114, wherein the access logic is programmed to search the access information database for the access information for the host device and forward the access control message to a neighboring device upon failing to find the access information for the host device in the access information database.

117. The computer program of claim 110, wherein the access information further comprises an expiration date for the access token.

118. The computer program of claim 117, wherein the access logic is programmed to determine whether the host device is authorized to access the shared tree based upon the expiration date for the access token.

119. The computer program of claim 118, wherein the access logic is programmed to determine that the host device is not authorized to access the shared tree upon determining that the access token has expired.

120. The computer program of claim 118, wherein the access logic is programmed to forward the access control message to a neighboring device upon determining that the access token has expired.

121. The computer program of claim 110, wherein the access logic is programmed to authenticate the host device using the access information and a predetermined authentication scheme.

122. The computer program of claim 121, wherein the access logic is programmed to receive authentication information from the host device and authenticate the host device based upon the access information and the authentication information received from the host device.

123. The computer program of claim 122, wherein the authentication information comprises a digital signature, and wherein the access logic is programmed to verify the digital signature using the access information and a predetermined digital signature scheme.

124. The computer program of claim 123, wherein the predetermined digital signature scheme comprises a keyed hash function.

125. The computer program of claim 124, wherein the keyed hash function comprises IPsec AH with Keyed-Hashing for Message Authentication using Message Digest 5 (HMAC-MD5).

126. The computer program of claim 124, wherein the keyed hash function comprises IPsec AH with Keyed-Hashing for Message Authentication using a Secure Hash Algorithm (HMAC-SHA-1).

127. The computer program of claim 121, wherein the access logic is programmed to determine that the host device is not authorized to access the shared tree upon determining that the authentication failed.

128. The computer program of claim 127, wherein the access logic is programmed to forward the access control message to a neighboring device upon determining that the authentication failed.

129. The computer program of claim 121, wherein the access logic is programmed to determine that the host device is authorized to access the shared tree upon determining that the authentication succeeded.

130. The computer program of claim 110, wherein the access information is programmed to establish a security association with the host device using the access information upon determining that the host device is authorized to access the shared tree.

* * * * *